No. 803,991. PATENTED NOV. 7, 1905.
T. T. CHALONER & G. H. CHIPCHASE.
BLANKET PROTECTING DEVICE.
APPLICATION FILED JAN. 6, 1905.
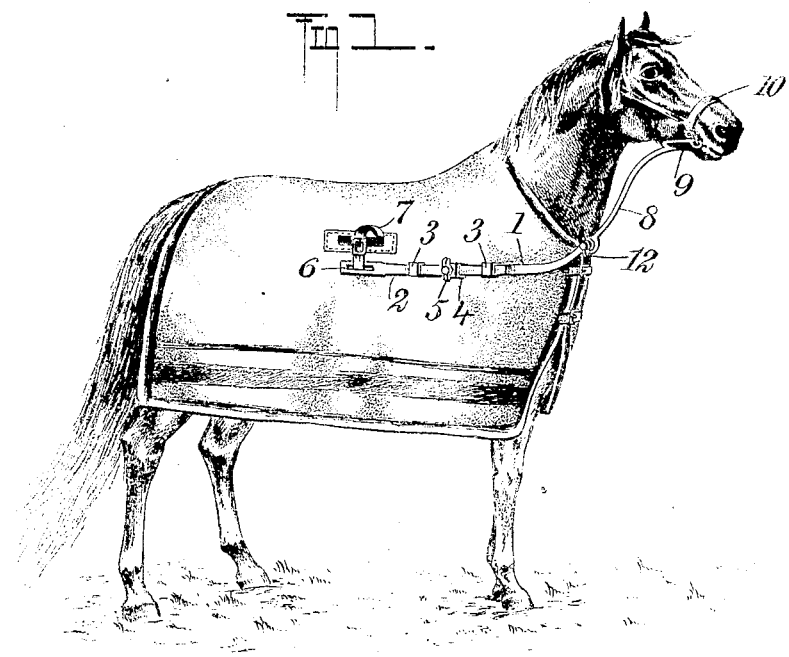
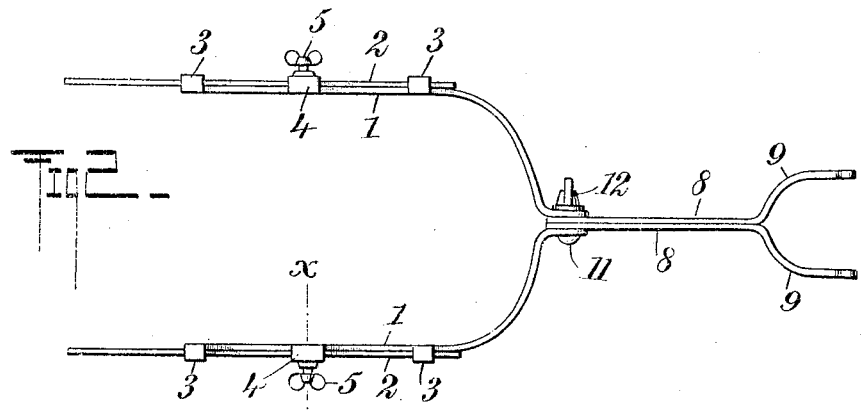
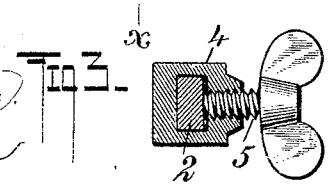
WITNESSES:
INVENTORS
Thomas T. Chaloner
George H. Chipchase
BY
ATTORNEYS

UNITED STATES PATENT OFFICE.

THOMAS TIMOTHY CHALONER AND GEORGE HENRY CHIPCHASE, OF NEW YORK, N. Y.

BLANKET-PROTECTING DEVICE.

No. 803,991.     Specification of Letters Patent.     Patented Nov. 7, 1905.

Application filed January 6, 1905. Serial No. 239,862.

*To all whom it may concern:*

Be it known that we, THOMAS TIMOTHY CHALONER and GEORGE HENRY CHIPCHASE, citizens of the United States, and residents of the city of New York, borough of Manhattan, in the county and State of New York, have invented a new and Improved Blanket-Protecting Device, of which the following is a full, clear, and exact description.

This invention relates to improvements in devices for preventing a horse from biting and tearing his blanket or clothing while in a stall and also serves as a means for preventing a vicious horse from turning his head laterally to injure with his teeth a person who may be leading him.

We will describe a sword-stick embodying our invention and then point out the novel features in the appended claims.

Reference is to be had to the accompanying drawings, forming a part of this specification, in which similar characters of reference indicate corresponding parts in all the views.

Figure 1 illustrates a horse with a device embodying our invention as applied. Fig. 2 shows the invention in plan, and Fig. 3 is a section on the line *x x* of Fig. 2.

The device comprises metal side bars 1 2, designed to extend along the sides of a horse, and the side bars of each side are telescopic or adjustable lengthwise with relation to each other. As here shown, the outer members 2 slide in guides 3, attached to the inner member or bar 1, and the said outer members also slide through boxings 4, attached to the inner member, and the outer members are held as adjusted by means of set-screws 5, which engage in tapped openings in said boxings. The ends of the members 2 are slotted, as indicated at 6, to receive straps 7, extended from the surcingle or the like. The forward ends of the side members are curved to pass around the chest of a horse, and adjustably connected with these curved members is a bar or bars 8, which have divergent portions 9, provided with eyes at the ends to receive straps attached to the head-stall or halter 10 on the horse. These bars 8 are secured to the side members by means of a bolt 11 and a thumb-nut 12. By this arrangement the bars 8 may be adjusted vertically with relation to the side members.

While we have shown the forward extension as consisting of two bars 8, it is obvious that a single bar may be employed and provided with divergent portions for engaging with the opposite sides of a horse's head.

A device embodying our invention will permit a horse to raise and lower his head, but will prevent any extended lateral movement of the head. Further, as the member 8 is curved or arched upward it will extend along the neck of the horse sufficiently close to prevent the horse from passing a front leg over the member while lying down, thus preventing possible damage or casting.

Having thus described our invention, we claim as new and desire to secure by Letters Patent—

1. A device for the purpose specified comprising telescopic adjustable side members adapted to pass along the sides of a horse and around the chest, means for holding the side members as adjusted, a forward projection having adjustable connection with the side members, and divergent portions on said forward projection and provided with eyes.

2. A device for the purpose specified, comprising telescopic side members adapted to pass along the sides of a horse and around the chest, set-screws for holding the side members as adjusted, a forward projection having adjustable connection with the side members, and divergent portions on said forward projection, the said divergent portions being provided with eyes.

3. A device for the purpose specified, comprising side members, each side member consisting of two sections having sliding connection, set-screws for holding the members as adjusted, and a forward projection provided with divergent portions and having a vertically-adjustable connection with the side members.

In testimony whereof we have signed our names to this specification in the presence of two subscribing witnesses.

THOMAS TIMOTHY CHALONER.
                GEORGE HENRY CHIPCHASE.

Witnesses:
   PAUL CHIPCHASE,
   CHAS. E. CLAYTON.